(12) United States Patent
Rath et al.

(10) Patent No.: US 7,741,410 B2
(45) Date of Patent: Jun. 22, 2010

(54) EPOXIDATION OF ISOBUTENE POLYMERS

(75) Inventors: Hans Peter Rath, Gruenstadt (DE); Arno Lange, Bad Duerkheim (DE); Helmut Mach, Heidelberg (DE); J. Richard Blackborow, Strasbourg (FR)

(73) Assignee: BASF Aktiengesellschaft, Ludwigshafen (DE)

( * ) Notice: Subject to any disclaimer, the term of this patent is extended or adjusted under 35 U.S.C. 154(b) by 112 days.

(21) Appl. No.: 12/065,434

(22) PCT Filed: Aug. 28, 2006

(86) PCT No.: PCT/EP2006/008407

§ 371 (c)(1),
(2), (4) Date: Feb. 29, 2008

(87) PCT Pub. No.: WO2007/025700

PCT Pub. Date: Mar. 8, 2007

(65) Prior Publication Data

US 2008/0227922 A1     Sep. 18, 2008

(30) Foreign Application Priority Data

Sep. 2, 2005    (DE) ................. 10 2005 041 789

(51) Int. Cl.
*C08F 8/08* (2006.01)

(52) U.S. Cl. .................. 525/383; 525/387; 549/526; 549/531

(58) Field of Classification Search ............... 525/383, 525/385, 387; 549/526, 527, 531, 528
See application file for complete search history.

(56) References Cited

U.S. PATENT DOCUMENTS

| 2,903,465 | A | * | 9/1959 | Suter et al. | ............... 549/527 |
| 3,382,255 | A | | 5/1968 | White et al. | |
| 6,303,703 | B1 | * | 10/2001 | Kinder et al. | ............ 525/333.7 |
| 6,448,418 | B1 | * | 9/2002 | Ott | ........................... 549/526 |

FOREIGN PATENT DOCUMENTS

| EP | 0 487 278 | 5/1992 |
| WO | 92 14806 | 9/1992 |
| WO | 99 33886 | 7/1999 |
| WO | 00 24726 | 5/2000 |
| WO | 03 074577 | 9/2003 |

OTHER PUBLICATIONS

U.S. Appl. No. 12/252,218, filed Oct. 21, 2008, Yoshida.

* cited by examiner

*Primary Examiner*—Ling-Siu Choi
(74) *Attorney, Agent, or Firm*—Oblon, Spivak, McClelland, Maier & Neustadt L.L.P.

(57) ABSTRACT

A process is described for epoxidizing an ethylenically unsaturated isobutene polymer, in which an organic phase comprising the isobutene polymer is contacted with an aqueous phase which comprises formic acid and hydrogen peroxide. The process affords essentially quantitative conversions after a short reaction time.

13 Claims, No Drawings

EPOXIDATION OF ISOBUTENE POLYMERS

CROSS-REFERENCE TO RELATED APPLICATIONS

The present application is a 35 U.S.C. §371 National Stage patent application of International patent application PCT/EP06/008407, filed on Aug. 28, 2006, which claims priority to German patent application DE 102005041789.2, filed on Sep. 2, 2005.

DESCRIPTION

The invention relates to a process for epoxidizing ethylenically unsaturated isobutene polymers.

Homo- and co-polymers of isobutene find various uses, for example for preparing fuel and lubricant additives, as elastomers, as adhesives or adhesive raw materials, or as a base constituent of sealant compositions. Polyisobutenes particularly suitable for further processing, for example, to give sealant compositions or to give adhesives or adhesive raw materials, are telechelic, i.e. they have two or more reactive end groups.

Epoxy groups are preferred reactive end groups; they can be reacted in various ways with suitable reactants or be converted to other functional groups without specific high-pressure or-temperature conditions being required.

WO 92/14806 and U.S. Pat. No. 6,303,703 disclose a process for epoxidizing isobutene polymers in which polyisobutene is initially charged in a hydrocarbon (heptane or xylene) and acetic acid, and 70% or 50% aqueous hydrogen peroxide solution and a mineral acid (phosphoric acid and sulfuric acid) are fed in. After the feeding has ended, the reaction is completed by stirring at 80° C. for six hours.

However, the handling of highly concentrated aqueous hydrogen peroxide solutions (more than 50% by weight of hydrogen peroxide) entails additional safety precautions.

It is an object of the invention to specify a process in which the use of highly concentrated hydrogen peroxide solutions is dispensable and which affords essentially quantitative conversions after a relatively short reaction time.

The object is achieved by a process for epoxidizing an ethylenically unsaturated isobutene polymer, in which an organic phase comprising the isobutene polymer is contacted with an aqueous phase which comprises formic acid and hydrogen peroxide.

The epoxidizing agent is suspected to be performic acid, which is formed in situ from the formic acid and the hydrogen peroxide. The performic acid has an advantageous partition equilibrium between the aqueous and the organic phase, which is additionally influenced in preferred embodiments of the invention by high hydrogen peroxide excesses, the withdrawal of water and/or additional use of mediators. The presence of the aqueous phase is required as a reservoir for the added formic acid or that formed by decomposition of performic acid, since excessively high acid concentrations in the organic phase can bring about undesired side reactions, especially a rearrangement of the epoxide formed to the aldehyde.

The isobutene polymer has at least one olefinic double bond, preferably on one end of the molecule or all ends of the molecule of the isobutene polymer.

In general, the organic phase comprises an aliphatic, alicyclic or aromatic hydrocarbon and/or a halogenated hydrocarbon. The hydrocarbon serves as the solvent for the isobutene polymer and to reduce the viscosity of the polymer solution. Suitable hydrocarbons are aliphatic hydrocarbons such as hexane, heptane; alicyclic hydrocarbons such as cyclohexane, methylcyclohexane, ethylcyclohexane; and aromatic hydrocarbons such as benzene, toluene or xylene, halogenated hydrocarbons such as dichloromethane, trichloromethane, 1-chlorobutene, 1,2-dichloroethane or chlorobenzene. Toluene and cyclohexane are the most preferred. The amount of hydrocarbon may, for example, be from 25 to 1000 parts by weight, preferably from 50 to 500 parts by weight, based on 100 parts by weight of isobutene polymer.

The aqueous phase comprises hydrogen peroxide and formic acid. The amount of formic acid is generally from 2 to 100 parts by weight, preferably from 5 to 50 parts by weight, based on 100 parts by weight of isobutene polymer.

Commercial hydrogen peroxide solutions are suitable, especially those having a hydrogen peroxide content of 30 or 50% by weight. The use of more highly concentrated hydrogen peroxide solutions is likewise possible but not preferred. The use of hydrogen peroxide solutions with less than 20% by weight is not preferred for practical reasons. The hydrogen peroxide is used in at least stoichiometric amounts based on the number of the double bonds to be epoxidized, but preferably in excess. The hydrogen peroxide excess present over and above the amount required stoichiometrically may be up to 20 mol per liter of aqueous phase, preferably from 0.5 to 10 mol.

The reaction proceeds with transfer of an oxygen atom from the hydrogen peroxide to the polyisobutene, for which performic acid formed temporarily is suspected to act as an oxygen transferer. With increasing conversion, the $H_2O_2$ concentration in the aqueous phase therefore falls, which constitutes the driving force of the reaction, and the reaction rate decreases. In preferred embodiments, the $H_2O_2$ concentration in the aqueous phase is therefore kept at least 45%, preferably at least 48%.

In a preferred embodiment, water is removed during the reaction by azeotropic distillation. To this end, the organic phase comprises an azeotroping agent, such as the abovementioned aliphatic, alicyclic or aromatic hydrocarbons and/or halogenated hydrocarbons. The azeotroping agent serves to separate out water, both a portion of the water introduced with the aqueous hydrogen peroxide solution and the water of reaction. The azeotroping agent forms an azeotrope with water, but is immiscible with water under cold conditions. The aqueous phase must not be removed fully. Excessive removal of the aqueous phase leads to the enhanced formation of by-products.

For the azeotropic removal of water, a typical water separator is appropriately used. Water distills over as an azeotrope with the azeotroping agent out of the reaction mixture with the vapors and precipitates out in the course of cooling in drops, which fall downward in the tube of the water separator. After the phase separation, the azeotroping agent can be recycled back into the batch. Since peracids are volatile to a certain extent, it is possible that peracids, for example performic acid or, when acetic acid is used additionally, peracetic acid, are also removed from the system with the vapors. It may therefore be advisable to pass the azeotroping agent through the separated aqueous phase before recycling it, in order to extract the peracids from the aqueous phase. For this purpose, for example, a rotary perforator is suitable.

A sufficiently large excess of $H_2O_2$ and a sufficiently concentrated hydrogen peroxide solution can be used, so that the $H_2O_2$ concentration in the aqueous phase does not fall below 45% (not below 48%) even at the end of the reaction. Alternatively, parts of the water can be bound by using a carboxylic anhydride such as acetic anhydride.

When working with $H_2O_2$ excesses, it is of course desirable to recycle the unconverted $H_2O_2$ and make it available for the reaction. It is therefore preferred to remove the aqueous phase, to concentrate it if appropriate, and to contact the concentrated aqueous phase again with an organic phase comprising an ethylenically unsaturated isobutene polymer. The term "concentration" shall comprise all measures by which the $H_2O_2$ concentration in the aqueous phase is increased. In a preferred process, the aqueous phase is admixed with an azeotroping agent and water is removed by azeotropic distillation until the desired $H_2O_2$ concentration has been attained. The aqueous phase thus treated can then, if appropriate after addition of fresh hydrogen peroxide be used for subsequent batches or be recycled into the same batch.

It is also conceivable to perform the process continuously and to conduct the organic phase and the aqueous phase in countercurrent to one another through an elongated reaction zone, in which case aqueous phase and/or the concentrated aqueous phase is introduced in the upper region of the reaction zone and the organic phase is introduced in the lower region of the reaction zone. An aqueous phase depleted in hydrogen peroxide or peracid can then be drawn off at the lower end of the reaction zone; the organic phase comprising the epoxidized isobutene polymer can be drawn off at the upper end.

The reaction is performed generally at a temperature in the range from 40 to 90° C., preferably from 45 to 75° C., in particular from 50 to 70° C. Since the reaction proceeds exothermically, it may, after the onset of the reaction, be necessary to cool the reaction mixture in order to keep the temperature within the range specified. The heat of reaction can also be removed fully or partly by evaporative cooling, i.e. by partial evaporation of the solvent used.

In order to be able to work within the temperature range specified when a relatively high-boiling solvent is used, it may be necessary to perform the reaction under reduced pressure. It is suitable, for example, to work at a pressure in the range from 100 to 600 mbar, preferably from 200 to 500 mbar.

It is preferred that the aqueous phase also comprises at least one mediator. The mediator accelerates the inventive reaction, presumably by promoting the temporary formation of performic acid in the aqueous phase and/or facilitating the transfer of the temporarily formed performic acid to the organic phase and/or reducing the solubility of the performic acid in the aqueous phase and/or catalyzing the decomposition of the performic acid in the organic phase and/or promoting the reaction in another way. Preferred mediators are selected from a) carboxylic acids other than formic acid,
b) carboxylic anhydrides,
c) carboxylic salts,
d) carboxylic esters
e) alcohols
f) ethers.

Preference is given to the combined additional use of a carboxylic acid other than formic acid and of a carboxylic salt; or of a carboxylic anhydride and of a carboxylic salt.

The carboxylic acid other than formic acid is typically a $C_2$-$C_{22}$- alkanecarboxylic acid, $C_7$-$C_{11}$-arylcarboxylic acid or $C_8$-$C_{22}$-aralkylcarboxylic acid, especially a $C_2$-$C_4$-alkanecarboxylic acid. The aryl radicals may bear substituents, for example one, two or three halogen atoms, especially chlorine, $C_1$-$C_4$-alkyl groups or $C_1$-$C_4$-alkoxy groups. Suitable carboxylic acids are acetic acid, propionic acid, caproic acid, benzoic acid, m-chlorobenzoic acid and the like. Acetic acid, propionic acid and mixtures thereof are particularly preferred, among which acetic acid is the most preferred. Formic acid and the carboxylic acid other than formic acid are used typically in a weight ratio of from 10:1 to 1:10, particularly from 1:1 to 1:5.

The carboxylic anhydride is typically the anhydride of a $C_2$-$C_{22}$-alkanecarboxylic acid, $C_7$-$C_{11}$-arylcarboxylic acid or $C_8$-$C_{22}$-aralkylcarboxylic acid, especially of a $C_2$-$C_4$-alkanecarboxylic acid. Acetic anhydride is the most preferred. Formic acid and acetic anhydride are used typically in a weight ratio of from 10:1 to 1:10, particularly from 1:1 to 1:5.

The carboxylic salt is typically an alkali metal or alkaline earth metal salt of a $C_1$-$C_{22}$-alkanecarboxylic acid, $C_7$-$C_{11}$-arylcarboxylic acid or $C_8$-$C_{22}$-aralkylcarboxylic acid, especially of a $C_1$-$C_4$-alkanecarboxylic acid. Sodium formate, sodium acetate are the most preferred. It is used typically in an amount of 2 to 20% by weight based on the amount of $H_2O_2$.

The carboxylic ester is typically a $C_1$-$C_8$-alkyl ether of a $C_1$-$C_{22}$-alkanecarboxylic acid, $C_7$-$C_{11}$-arylcarboxylic acid or $C_8$-$C_{22}$-aralkylcarboxylic acid, especially of a $C_1$-$C_4$-alkanecarboxylic acid. Ethyl acetate is the most preferred. When used, the ester is used typically in an amount of from 2 to 20% by volume, in particular from 5 to 10% by volume, based on the entirety of aqueous and organic phase.

The alcohol is preferably a $C_1$-$C_8$-alcohol such as ethanol, 1-propanol, 2-propanol. When used, the alcohol is used typically in an amount of from 2 to 20% by volume, in particular from 5 to 10% by volume, based on the entirety of aqueous and organic phase.

The ethers may be symmetric or unsymmetric di-$C_1$-$C_8$ alkyl ethers or cyclic ethers such as tetrahydrofuran or dioxane. When used, the ether is used typically in an amount of from 2 to 20% by volume, in particular from 5 to 10% by volume, based on the entirety of aqueous and organic phase.

The additional use of catalytic amounts of a mineral acid such as sulfuric acid or phosphoric acid, or of a sulfonic acid such as methanesulfonic acid or toluenesulfonic acid, as an acidic catalyst is possible but not preferred.

The epoxide formed is generally a viscous liquid which can be isolated by removing the aqueous phase and evaporating off the azeotroping agent. Preference is given to washing the organic phase after the removal of the aqueous phase. The aqueous phase and the wash water may, if appropriate after concentration and/or other treatments, be used for subsequent batches. For more rapid phase separation, especially in the case of relatively high molecular weights of the isobutene polymer, further amounts of solvent can be added.

The degree of epoxidation is generally more than 90%. The epoxidized isobutene polymer obtained by the process according to the invention is generally used without further purification.

Isobutene Polymers

The isobutene polymers which are useful as a starting material for the process according to the invention comprise generally at least 50% by weight of isobutene units, preferably at least 80% by weight of isobutene units, in particular at least 95% by weight of isobutene units. In addition to isobutene units, the isobutene polymer may also comprise units of olefinically unsaturated monomers which are copolymerizable with isobutene under cationic polymerization conditions. The comonomers may be distributed randomly in the polymer or be arranged as blocks. Useful copolymerizable monomers include in particular vinylaromatics such as styrene, $C_1$-$C_4$-alkylstyrenes such as α-methylstyrene, 3- and 4-methylstyrene, or 4-tert-butylstyrene, and also isoolefins having from 5 to 10 carbon atoms such as 2-methylbutene-1, 2-methylpentene-1,2-methylhexene-1,2-ethylpentene-1,2-ethylhexene-1 and 2-propylheptene-1.

The isobutene polymer generally has a number-average molecular weight of from 500 to 50 000, preferably from 1000 to 10 000, in particular from 1500 to 5000.

The olefinically unsaturated group may, for example, be aliphatic unsaturated groups having from 2 to 6 carbon atoms, such as vinyl, allyl, methylvinyl, methallyl, propenyl, 2-methylpropenyl, butenyl, pentenyl, hexenyl; or cyclic unsaturated hydrocarbon radicals such as cyclopropenyl, cyclobutenyl, cyclopentenyl and cyclohexenyl. Preference is given to isobutene polymers having terminal allyl, methallyl, 2-methylpropenyl or cyclopentenyl groups.

In one embodiment, the isobutene polymer is highly reactive polyisobutene. The so-called highly reactive polyisobutenes are polyisobutenes having a high content of methylidene groups, generally of more than 75 mol %. Methylidene groups are understood to mean those double bonds whose position in the polyisobutene macromolecule is described by the general formula

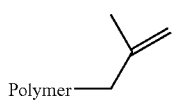

in which "polymer" represents a polyisobutene radical shortened by one isobutene unit.

Highly reactive polyisobutenes may be obtained by polymerizing isobutene with boron trifluoride catalysis. EP 322 241 describes a process for preparing highly reactive polyisobutenes in which isobutene is polymerized in the presence of boron trifluoride and of a cocatalyst, and the polymerization product is quenched immediately.

Suitable polyisobutenes are available commercially and in various molecular weights, for example, under the name Glissopal® from BASF Aktiengesellschaft.

In particularly preferred embodiments, the isobutene polymer has an average of at least 1.4, preferably at least 1.8, olefinic double bonds per molecule. They are linear molecules which essentially have olefinic double bonds at both ends of the molecule, or star-shaped polymers which have olefinic double bonds at the ends of the molecule.

Such isobutene polymers can be prepared by processes which are described in U.S. Pat. Nos. 4,946,889, 4,327,201, 5,169,914, EP-A-206 756, EP-A-265 053, and also comprehensively in J. P. Kennedy, B. Ivan, "Designed Polymers by Carbocationic Macromolecular Engineering", Oxford University Press, New York, 1991. The isobutene polymers are prepared by living cationic polymerization of isobutene. The initiator system used comprises generally a Lewis acid and an "initiator", i.e. an organic compound having a readily substitutable leaving group which forms a carbocation or a cationogenic complex with the Lewis acid. The initiator is generally a tertiary halide, a tertiary ester or ether or a compound having a halogen atom in the allyl position or an alkoxy or acyloxy group in the allyl position. The carbocation or the cationogenic complex add successive isobutene molecules onto the cationic site, which forms a growing polymer chain whose end is usually terminated by a carbocation or the leaving group of the initiator. The initiator may be monofunctional or have higher functionality; in the latter case, polymer chains grow in more than one direction.

Isobutene polymers with a terminal double bond can be obtained in various ways. It is possible to start from olefinically unsaturated inifer molecules. In order to obtain polyisobutene molecules having more than one terminal double bond per molecule, it is likewise possible to introduce an olefinic double bond at the distal chain end or to couple two or more living polymer chains. Both possibilities are explained in detail below.

Alternatively, the starting materials used are initiator molecules without an olefinic double bond and the distal chain ends are terminated to form an ethylenically unsaturated group, in which case for example, the reactive chain ends are reacted with a terminating reagent which attaches an ethylenically unsaturated group to the chain ends, or treated in a suitable manner to convert the reactive chain ends to such groups.

Preference is given to initiators in which the functional group has the general formula FG

in which

X is selected from halogen, $C_1$-$C_6$-alkoxy and $C_1$-$C_6$-acyloxy, $R^1$ is hydrogen or methyl and $R^2$ is methyl or, with $R^1$ or the molecular moiety to which the functional group FG is bonded, forms a $C_5$-$C_6$-cycloalkyl ring; $R^2$ may also be hydrogen when the functional group FG is bonded to an aromatic or olefinically unsaturated carbon atom.

The initiators preferably have one, two, three or four, in particular one or two, and more preferably two, functional groups FG. X in formula (FG) is preferably a halogen atom, in particular chlorine.

Preferred initiators obey, for example, the general formulae I-A to I-F:

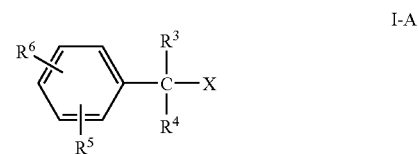

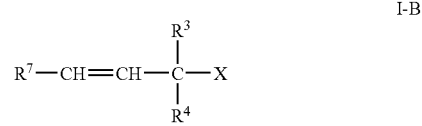

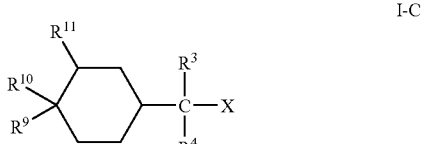

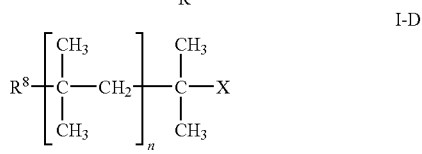

-continued

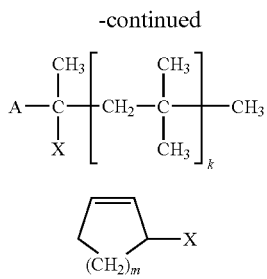
I-E

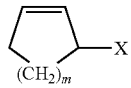
I-F in which X is as defined above;
n and k are each independently 0, 1, 2, 3, 4 or 5;
m is 1, 2 or 3;
$R^3$, $R^4$ and $R^{10}$ are each independently hydrogen or methyl;
$R^5$, $R^6$ and $R^7$ are each independently hydrogen, $C_1$-$C_4$-alkyl or a $CR^3R^4$—X group in which $R^3$, $R^4$ and X are each as defined above; and
$R^8$ is hydrogen, methyl or an X group; and
$R^9$ and $R^{11}$ are each hydrogen or an X group; and
A is an ethylenically unsaturated hydrocarbon radical which has a vinyl group or a cycloalkenyl group.

In the formulae I-A to I-C, $R^3$ and $R^4$ are preferably each methyl. In the formula I-A, $R^6$ is, for example, a $CR^3R^4$—X group which is arranged in the para- or meta-position to the $CR^3R^4X$ group, especially when $R^5$ is hydrogen. It may also be in the meta-position when the $R^5$ group is $C_1$-$C_4$-alkyl or a $CR^3R^4$—X group. Preferred compounds I-A are, for example: 2-chloro-2-phenylpropane and 1,4-bis(2-chloro-2-propyl)-benzene (1,4-dicumyl chloride, 1,4-DCC) or 1,3-bis(2-chloro-2-propyl)benzene (1,3-dicumyl chloride, 1,3-DCC).

Examples of compounds of the formula I-B are allyl chloride, methallyl chloride, 2-chloro-2-methylbutene-2 and 2,5-dichloro-2,5-dimethylhexene-3.

In the compounds I-C, $R^3$ is preferably methyl. $R^9$ is preferably an X group, and in particular halogen, especially when $R^{10}$ is methyl. Examples of compounds of the general formula I-C are 1,8-dichloro-4-p-menthane (limonene dihydrochloride), 1,8-dibromo-4-p-menthane (limonene dihydrobromide), 1-(1-chloroethyl)-3-chlorocyclohexane, 1-(1-chloroethyl)-4-chlorocyclohexane, 1-(1-bromoethyl)-3-bromocyclohexane and 1-(1-bromoethyl)-4-bromocyclohexane.

Among the compounds of the formula I-D, preference is given to those in which $R^8$ is a methyl group. Preference is also given to the compounds of the general formula I-D in which $R^8$ is an X group and in particular a halogen atom when n>0.

In compounds I-E, A is a hydrocarbon radical having generally from 2 to 21 carbon atoms which either has a vinyl group ($CH_2$=CH—) or a $C_5$-$C_8$-cycloalkenyl radical, e.g. cyclopenten-3-yl, cyclopenten-4-yl, cyclohexen-3-yl, cyclohexen-4-yl, cyclohepten-3-yl, cyclohepten-4-yl, cycloocten-3-yl, cycloocten-4-yl or cycloocten-5-yl.

A is preferably a radical of the formulae A.1, A.2 or A.3

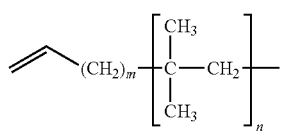
A.1

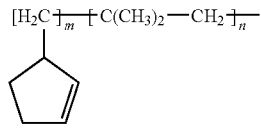
A.2

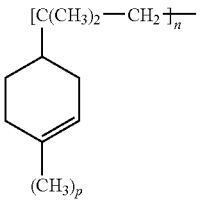
A.3 in which
m is 0 or 1;
n is an integer from 0 to 3, in particular 0, 1 or 2, and
p is 0 or 1.

In compounds I where A=A.2, m is preferably 1.
In compounds I where A=A.3, n is preferably 0. p is preferably 1.

Examples of initiator compounds I are:
2-chloro-2-methylbutene-3, 2-chloro-2-methylpentene-4, 2-chloro-2,4,4-trimethylhexene-5, 2-chloro-2-methyl-3-(cyclopenten-3-yl)propane, 2-chloro-2-methyl-4-(cyclohexen-4-yl)pentane and 2-chloro-2-(1-methylcyclohexen-4-yl)propene.

In compounds of the formula I-F, X is preferably chlorine. m is preferably 1 or 2 and more preferably 1. A preferred compound of the formula I-F is 3-chlorocyclopentene. The initiators used are more preferably compounds of the formula I-A and in particular 1,4-bis(2-chloro-2-propyl)benzene (1,4-dicumyl chloride, 1,4-DCC) or 1,3-bis(2-chloro-2-propyl)benzene (1,3-dicumyl chloride, 1,3-DCC), particular preference being given to 1,4-dicumyl chloride.

The above-described initiators and processes for their preparation are known and are described, for example, in WO 02/48215, WO 03/074577 and in the German patent application 10328854.6.

Useful Lewis acids are covalent metal halides and semimetal halides which have a vacant orbital for an electron pair. Such compounds are known to those skilled in the art, for example from J. P. Kennedy et al. in U.S. Pat. Nos. 4,946,889, 4,327,201, 5,169,914, EP-A-206 756, EP-A-265 053, and comprehensively in J. P. Kennedy, B. Ivan, "Designed Polymers by Carbocationic Macromolecular Engineering", Oxford University Press, New York, 1991. They are generally selected from halogen compounds of titanium, of tin, of aluminum, of vanadium, or of iron, and the halides of boron. Preference is given to the chlorides and, in the case of aluminum, also to the monoalkylaluminum dichlorides and the dialkylaluminum chlorides. Preferred Lewis acids are titanium tetrachloride, boron trichloride, boron trifluoride, tin tetrachloride, aluminum trichloride, vanadium pentachloride, iron trichloride, alkylaluminum dichlorides and dialkylaluminum chlorides. Particularly preferred Lewis acids are titanium tetrachloride, boron trichloride and ethylaluminum dichloride and in particular titanium tetrachloride. Alternatively, a mixture of at least two Lewis acids may also be used, for example boron trichloride in a mixture with titanium tetrachloride.

It has been found to be useful to carry out the polymerization in the presence of an electron donor. Preferred donors are pyridine and sterically hindered pyridine derivatives, and in particular organosilicon compounds.

The polymerization is typically performed in a solvent or solvent mixture, such as aliphatic hydrocarbons, aromatic hydrocarbons and halogenated hydrocarbons. Particularly useful solvents have been found to be mixtures of aliphatic, cycloaliphatic or aromatic hydrocarbons with halogenated hydrocarbons, such as dichloromethane/n-hexane, dichloromethane/methylcyclohexane, dichloromethane/toluene, chloromethane/n-hexane, 1-chlorobutane/hexane, 1-chlorobutane/toluene and the like.

In order to introduce an olefinic double bond at the distal chain end, the reactive chain end is reacted with a terminating reagent which attaches an olefinically unsaturated group on to the chain end, or the reactive chain end is treated in a manner suitable for converting it to such a group.

In the simplest embodiment, the chain end is subjected to a dehydrohalogenation reaction, for example by thermal treatment, for example by heating to a temperature of from 70 to 200° C., or by treatment with a base. Suitable bases are, for example, alkali metal alkoxides such as sodium methoxide, sodium ethoxide and potassium tert-butoxide, basic alumina, alkali metal hydroxides such as sodium hydroxide, and tertiary amines such as pyridine or tributylamine; cf. Kennedy et al., Polymer Bulletin 1985, 13, 435-439. Preference is given to using sodium ethoxide.

Alternatively, the chain end is terminated by adding a trialkylallylsilane compound, for example, trimethyallylsilane. The use of the allylsilanes leads to the termination of the polymerization with the introduction of an allyl radical at the polymer chain end; cf. EP 264 214.

In a further embodiment, the reactive chain end is reacted with a conjugated diene such as butadiene (cf. DE-A 40 25 961) or an unconjugated diene such as 1,9-decadiene or an alkenyloxystyrene such as p-hexenyloxystyrene (cf. JP-A-4-288309).

In a further embodiment, addition of a coupling agent results in coupling of two or more living polymer chains. "Coupling" means the formation of chemical bonds between the reactive chain ends, so that two or more polymer chains are joined to form a molecule. The molecules obtained by coupling are symmetric, telechelbic or star-shaped molecules having groups of the initiator, for example, cyclopentenyl groups, at the molecule ends or the ends of the branches of the star-shaped molecule.

Suitable coupling agents have, for example, at least two electrofugic leaving groups, for example trialkylsilyl groups, arranged in the allyl position to the same double bond or different double bonds, so that the cationic site of one reactive chain end can add on in a concerted reaction with elimination of the leaving group and shifting of the double bond. Other coupling agents have at least one conjugated system, to which the cationic site of a reactive chain end can add electrophilically to form a stabilized cation. Elimination of a leaving group, for example of a proton, then results, with reformation of the conjugated system, in a stable σ-bond to the polymer chain. A plurality of these conjugated systems may be joined to one another by inert spacers.

The suitable coupling agents include:

(i) compounds which have at least two 5-membered heterocycles having a heteroatom selected from oxygen, sulfur and nitrogen, for example organic compounds which have at least two furan rings, such as

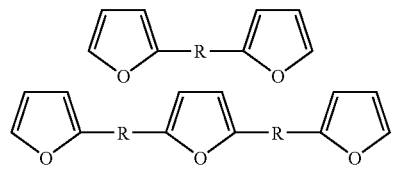

in which R is $C_1$-$C_{10}$-alkylene, preferably methylene or 2,2-propanediyl;

(ii) compounds having at least two trialkylsilyl groups in the allyl position, such as 1,1-bis(trialkylsilylmethyl)ethylenes, e.g. 1,1-bis(trimethylsilylmethyl)ethylene, or bis[(trialkylsilyl)propenyl]benzenes, e.g.

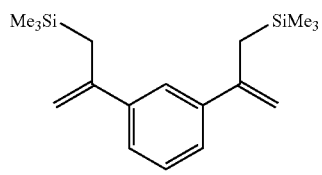

(in which Me is methyl), (iii) compounds having at least two vinylidene groups arranged in conjugation to in each case two aromatic rings, such as bisdiphenylethylenes, e.g.

14

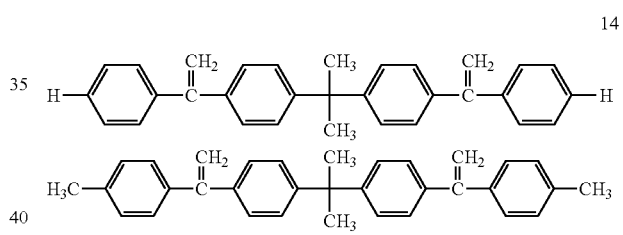

A description of suitable coupling agents can be found in the following references; the coupling reaction can be carried out analogously to the reactions described there: R. Faust, S. Hadjikyriacou, Macromolecules 2000, 33, 730-733; R. Faust, S. Hadjikyriacou, Macromolecules 1999, 32, 6393-6399; R. Faust, S. Hadjikyriacou, Polym. Bull. 1999, 43, 121-128; R. Faust, Y. Bae, Macromolecules 1997, 30, 198; R. Faust, Y. Bae, Macromolecules 1998, 31, 2480; R. Storey, Maggio, Polymer Preprints 1998, 39, 327-328; WO99/24480; U.S. Pat. Nos. 5,690,861 and 5,981,785.

The coupling is generally effected in the presence of a Lewis acid, suitable Lewis acids being those which can also be used to carry out the actual polymerization reaction. To carry out the coupling reaction, the same solvents and temperatures as are used to carry out the actual polymerization reaction are also suitable. Appropriately, the coupling can therefore be carried out as a one-pot reaction after the polymerization reaction in the same solvent in the presence of the Lewis acid used for the polymerization.

Subsequent Reactions

The epoxide obtained by the process according to the invention can be converted further in various ways.

The epoxide can be reacted with, for example, thiols or primary or secondary amines to obtain, inter alia, glycol thioethers and amines.

Reaction of an isobutene polymer which, on average, has at least 1.4, preferably at least 1.8, epoxy groups per molecule with polyols or especially polythiols, such as trimethylolpropane tris(3-mercaptopropionate) or pentaerythrityl tetrakis (3-mercaptopropionate), or polyamines, such as diethylenetriamine, affords networks which are advantageous owing to their elastic and damping properties.

In a preferred subsequent reaction, the epoxide is rearranged to the aldehyde, which can be done, for example, with catalysis by means of aluminosilicates, for example, zeolites, acidic alumina, Lewis acids such as aluminum or zinc salts, e.g. zinc bromide, or protic acids such as sulfuric acid. The aldehyde is in turn a versatile starting material for valuable products. The conversion of polyisobutenyl epoxides to aldehydes is described, for example, in WO 90/10022 and U.S. Pat. No. 6,303,703, or Organikum, 20th ed. 1999, Wiley-VCH, p. 615, which are fully incorporated by reference.

The aldehyde can be converted to an imine with ammonia or a primary amine, and the imine can be reduced, especially catalytically hydrogenated, to the amine. Suitable primary amines are, for example, diethylenetriamine, di(methylethylene)triamine, triethylenetetramine, tri(methylethylene)tetramine, tri(ethylethylene)tetramine, tetraethylenepentamine, pentaethylenehexamine, ethylenediamine, hexamethylenediamine, o-phenylenediamine, m-phenylenediamine, p-phenylenediamine, alkyl-substituted o-, m- and p-phenylenediamine, dimethylaminomethylamine, dimethylaminoethylamine, dimethylaminopropylamine, dimethylaminobutylamine, dimethylaminoheptylamine, diethylaminomethylamine, diethylaminopropylamine, diethylaminoamylamine, dipropylaminopropylamine, methylpropylaminoamylamine, propylbutylaminoethylamine, dimethylenetrianiline, methylenedianiline, polymethyleneaniline, and polyalkylmethyleneaniline. The reaction of the aldehyde with the primary amine and the hydrogenation of the resulting imine to a polyisobutenylamine is described in WO 90/10022, which is fully incorporated by reference.

The aldehyde can also be converted to an oxime, and the oxime reduced to the amine. Appropriately, hydroxylamine, which is obtained by neutralizing a hydroxylammonium salt, is used. The hydroxylamine reacts with the aldehyde to give the oxime. The oxime is then reduced by catalytic hydrogenation to the amine. The hydrogenation is effected at suitable temperature and pressure in the presence of a hydrogenation catalyst. Suitable catalysts are, for example Raney nickel, nickel on kieselguhr, copper chromite, platinum on carbon, palladium on carbon and the like. The reaction is described, for example in U.S. Pat. No. 6,303,703 which is fully incorporated by reference.

In a further preferred embodiment, the aldehyde is converted to a formamide in a Leuckart reaction. To perform the Leuckart reaction, various reagents are suitable; ammonium formate is preferred. The formamide can then be converted to an amine by hydrolysis. The hydrolysis can suitably be performed with dilute hydrochloric acid at moderately elevated temperature. Preference is given to using a phase transfer catalyst such as tricaprylylmethylammonium nitrate. The reaction is described, for example in U.S. Pat. No. 6,303,703 which is fully incorporated by reference.

The epoxide can additionally be converted to a 2-polyisobutenyl-1,3-propanediol by reaction with a borane and subsequent oxidative cleavage of the ester formed, as illustrated below.

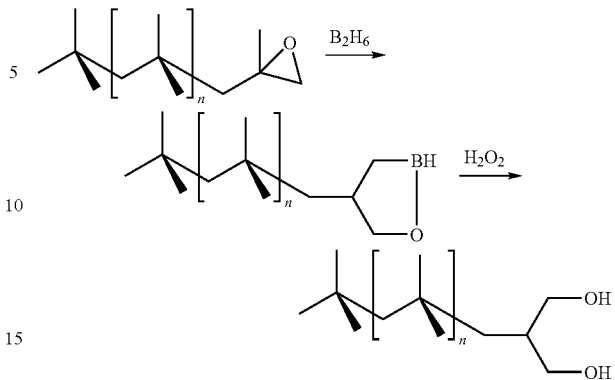

Suitable boranes are, for example, diborane ($B_2H_6$) and alkyl- and arylboranes $RBH_2$ (R=alkyl or aryl). It is familiar to the person skilled in the art that such boranes can also be prepared in situ from a borohydride and an acid, usually $BF_3$ etherate. The reaction with the borane is effected suitably in a borane-coordinating solvent. Examples thereof are open-chain ethers such as dialkyl ethers, diaryl ethers or alkyl aryl ethers, and cyclic ethers, such as tetrahydrofuran or 1,4-dioxane, but solvents such as toluene, cyclohexane, and methylene chloride are also suitable. The oxidative cleavage to give the 1,3-diol can be effected, for example, by means of hydrogen peroxide in the presence of a base with heating to, for example, from 50 to 75° C. Suitable solvents for this purpose are ethers or mixtures of ethers and hydrocarbons.

The conversion of the epoxide to a 2-polyisobutenyl-1,3-propanediol is described, for example in EP-A-0737662, which is hereby fully incorporated by reference.

Networks

Isobutene polymers with isocyanate-reactive groups, such as hydroxyl groups, mercapto groups or amino groups, can be reacted with isocyanate crosslinkers to give networks. Terminal amino groups can be converted with phosgene to isocyanate groups which cannot react with unconverted amino groups.

A crosslinker is, for example, a difunctional or higher-functionality isocyanate which is preferably selected from diisocyanates, the biurets and cyanurates of diisocyanates, and also the adducts of diisocyanates to polyols. Suitable diisocyanates have generally from 4 to 22 carbon atoms. The diisocyanates are typically selected from aliphatic, cycloaliphatic and aromatic diisocyanates, for example 1,4-diisocyanatobutane, 1,6-diisocyanatohexane, 1,6-diisocyanato-2,2,4-trimethylhexane, 1,6-diisocyanato-2,4,4-trimethylhexane, 1,2-, 1,3 and 1,4-diisocyanatocyclohexane, 2,4- and 2,6-diisocyanato-1-methylcyclohexane, 4,4'-bis(isocyanatocyclohexyl)methane, isophorone diisocyanate (=1-isocyanato-3,3,5-trimethyl-5-isocyanatomethylcyclohexane), 2,4- and 2,6-toluoylene diisocyanate, tetramethylene-p-xylylene diisocyanate (=1,4-bis(2-isocyanatoprop-2-yl) benzene), 4,4'-diisocyanatodiphenylmethane, preferably 1,6-diisocyanatohexane and isophorone diisocyanate, and mixtures thereof. Preferred compounds comprise the cyanurates and biurets of aliphatic diisocyanates, especially the cyanurates. Particularly preferred compounds are the isocyanurate and the biuret of isophorone isocyanate, and the isocyanurate and the biuret of 1,6-diisocyanatohexane. Examples of adducts of diisocyanates to polyols are the adducts of the above-mentioned diisocyanates to glycerol, trimethylolethane and trimethylolpropane, for example the adduct of toluoylene diisocyanates to trimethylolpropane, or the adducts of 1,6-diisocyanatohexane or isophorone diisocyanate to trimethylpropane and/or glycerol.

To accelerate the reaction between the isocyanate-reactive groups of the isobutene polymer and the isocyanate groups of the crosslinker, known catalysts, for example, dibutyltin dilaurate, tin(II) octoate, 1,4-diazabicyclo[2.2.2]octane, or amines such as triethylamine, may be used. These are typically used in an amount of from $10^{-5}$ to $10^{-2}$ g, based on the weight of the crosslinker.

The crosslinking density can be controlled by varying the functionality of the polyisocyanate, the molar ratio of the polyisocyanate to the hydroxyl-terminated isobutene polymer, or by additionally using monofunctional compounds reactive toward isocyanate groups, such as monohydric alcohols, for example ethylhexanol or propylheptanol.

The invention is illustrated in detail by the examples which follow.

EXAMPLE 1

Preparation of Polyisobutene

A 1 l four-neck flask to which a dropping funnel with pressure equalizer and a dry ice cooler and drying tube had been attached was initially charged with 1-chlorobutane (440 ml) and, as an indicator, phenanthroline (20 mg). Isobutene (560 ml) was then condensed into the dropping funnel and the contents of the dropping funnel were emptied into the flask. A syringe was used to admix the mixture with a solution of butyllithium in hexane (1 M, about 10 ml), until a lasting brown color occurred.

A second 1 l four-neck flask to which a dropping funnel with pressure equalizer and a dry ice cooler and drying tube had been attached and which was connected to the first flask via a closable pipe connection was initially charged with 1,3-dicumyl chloride (43.6 g). The contents of the first flask were heated while gently cooling the second flask, so that the contents of the first flask distilled over into the second flask.

Phenyltriethoxysilane (1.44 g) was added in the second flask with stirring by means of a syringe and cooled to −76° C. with acetone/dry ice. TiCl$_4$ (2.0 ml) was then added by means of a syringe and, after a reaction time of 30 min, acetonitrile (2 g).

The resulting brown precipitate was filtered off; the filtrate was swirled over alumina (spheres with diameter 2-3 mm; 100 g) for 10 min. The solvent was removed under reduced pressure at room temperature.

The molecular weight Mn of the resulting polymer was 2227 (GPC determination), the polydispersity 1.40. The average content of chlorine atoms per polyisobutene molecule was 1.9 (determination by $^1$H NMR).

100 g of the polymer thus obtained were dissolved in 100 ml of tetrahydrofuran and heated to boiling under reflux with 10 g of potassium tert-butoxide. This was followed by admixing with 200 ml each of heptane, isopropanol and water, mixing and removal of the aqueous phase after 10 min. The organic phase was washed twice with 200 ml of saturated sodium chloride solution, dried over sodium sulfate and concentrated to dryness.

In the $^1$H NMR, 98% olefin groups were found (olefinic protons at 4.6 and 4.8 ppm).

Example 2

Epoxidation 200 g of polyisobutene from example 1, 200 ml of toluene, 18.5 of formic acid, 62 g of acetic acid and 55 g of hydrogen peroxide (50% by weight aqueous solution) were heated to 60° C. in a 1 l four-neck flask with heating bath, stirrer and water separator with vigorous stirring at 300 mbar, 65 ml of toluene were distilled off and 15 g of aqueous phase were separated out. The mixture was allowed to react further at 65° C. with stirring for 1 hour and the reaction mixture was cooled with ice to room temperature and the aqueous phase was allowed to settle out. After 5 min, the aqueous phase was removed, and the organic phase was admixed with 40 ml of water and stirred for 5 min. After 5 min, the stirrer was switched off and, after a further 5 min, 46 ml of aqueous phase were removed. The washing operation was repeated. Thereafter, the organic phase had an acid number of 2 and still comprised about 10 ppm of peroxide, which was destroyed by adding 30 g of saturated FeCl$_2$ solution. The organic phase was removed and dried over sodium sulfate, and a sample was concentrated to dryness at room temperature under reduced pressure (2 mbar).

The $^1$H NMR showed 1% olefin groups (4.6-5.2 ppm) and 98% epoxy groups, of which 97% were 1,2-epoxide (2.55-2.59 ppm), and 1% were 2,3-epoxide (2.53-2.55 ppm), based on the aromatic proton at 7.4 ppm.

Example 3

Preparation of a Polyol

The epoxide from example 2 was used and the method of EP-A 737 662, example 1 was employed.

An OH functionality of 3.5 was obtained, based on the aromatic proton at 7.4 ppm.

Example 4

Preparation of an Aldehyde

The epoxide from example 2 was used and the method of EP-A 468 966, example 4c first part, was employed.

Example 5

Preparation of an Amine

The aldehyde from example 4 was used and the method of EP-A 468 966, example 4c, was employed, except that NH$_3$ was used in place of dimethylaminopropylamine.

Example 6

1 g of polyisobutene diepoxide from example 2 was dissolved in 1 ml of chloroform and mixed with 150 mg of trimethylolpropane tris(3-mercaptopropionate), transferred to a glass dish and heated to 100° C. within 1 hour, and, after a further 2 hours, cooled to room temperature. The resulting network was subjected to a dynamic mechanical analysis (DMA). The storage modulus at 75° C. was 5 MPa.

Example 7

1 g of polyisobutene polyol from example 3 was dissolved in 1 ml of toluene and stirred with 300 mg of Basonat® HI 100

(predominantly hexamethylene diisocyanate trimer as the isocyanurate) for 30 min, then admixed with 3 mg of dibutyltin dilaurate, poured into a dish and heated to 100° C. for 6 hours. A slightly tacky, transparent network was obtained, which was subjected to dynamic mechanical analysis. The storage modulus at 75° C. was 8 MPa.

Example 8

1 g of polyisobutenediamine from example 5 was dissolved in 1 ml of toluene and stirred with 200 mg of Basonat® HI 100 for 1 min and poured rapidly into a dish. After 1 min, a network was obtained which was no longer tacky. The toluene was dried in a vacuum drying cabinet at 40° C. overnight. The sample was then subjected to dynamic mechanical analysis. The storage modulus was 83.5 MPa at room temperature, 10 MPa at 75° C.

Example 9

Epoxidation in the Presence of Acetic Anhydride 12.7 g of formic acid, 37.9 g of acetic anhydride and 74.8 g of hydrogen peroxide (50% by weight aqueous solution) and 3 g of sodium formate were combined in a 1 l four-neck flask with heating bath, stirrer and water separator with vigorous stirring and under ice cooling, admixed after 10 min with a solution of 222 g of polyisobutene from example 1 and 100 ml of toluene and heated to 60° C. at 320 mbar within 5 minutes, 65 ml of toluene and 10 g of aqueous phase were separated out within 20 minutes, the aqueous distillate was removed and the toluene was recycled into the batch. The mixture was allowed to react further at 60° C. with stirring for 1 hour and the reaction mixture was cooled with ice to RT and the aqueous phase was allowed to settle out. After 5 min the aqueous phase was removed, and the organic phase was admixed with 300 ml of water and stirred for 5 min. After 5 min, the stirrer was switched off and, after a further 5 min, the aqueous phase was removed. The washing operation was repeated twice. The organic phase was removed and dried over sodium sulfate, and a sample was concentrated to dryness under reduced pressure (2 mbar) at room temperature.

The 1H NMR showed 0.5% olefin groups (4.8 ppm) and 99% epoxy groups, of which 98% were 1,2 epoxide (2.55-2.59 ppm) and 1% were 2,3-epoxide (2.53-2.55 ppm), and 0.5 ppm of aldehyde, based on the aromatic proton at 7.4 ppm.

Example 10

Epoxidation of Glissopal 1000

200 g of Glissopal 1000 (highly reactive polyisobutene, Mn about 1000), 100 ml of toluene, 15 of formic acid, 40 g of acetic acid and 75 g of hydrogen peroxide (50% by weight aqueous solution) were heated to 60° C. in a 1 l four-neck flask with heating bath, stirrer and water separator with vigorous stirring at 330 mbar. An exothermic reaction set in, which was recognizable by the commencement of reflux. After 30 minutes, the bath temperature was increased to 80° C. About 25 ml of water was separated out and the mixture stirred for a further 1 hour. The reaction mixture was cooled with ice, a further 200 ml of toluene were added and the aqueous phases were allowed to separate out. After 5 min, the aqueous phase (98 ml) was removed, and the organic phase was admixed with 40 ml of water and stirred for 5 min. After 5 min, the stirrer was switched off and, after a further 5 min, 46 ml of aqueous phase were removed. The organic phase had an acid number of 2 and still comprised about 10 ppm of peroxide, which were destroyed by adding 30 g of saturated FeCl$_2$ solution. The organic phase was removed and dried over sodium sulfate, and a sample was concentrated to dryness under reduced pressure (2 mbar) at room temperature.

The resulting polyisobutene epoxide was analyzed by means of 1H NMR spectroscopy. The results are summarized in the table below.

Comparative Example

Example 10 of U.S. Pat. No. 6,303,703 was repeated, except that Glissopal 1000 was used in place of Amoco H100HR. In a further experiment, the method was modified and the reaction was stopped after only 1 hour. The resulting polyisobutene epoxides were analyzed by means of 1H NMR spectroscopy. The results are summarized in the table below.

| Analysis | Example 10 | Comparative example |
|---|---|---|
| Reaction time [h] | 1 | 1 | 5 |
| Olefin content 4.77-4.86 ppm [%] | 2 | 25 | 0 |
| Olefin content 5.17-5.26 ppm [%] | 0 | 0 | 1.7 |
| 1,2-oxide 2.55-2.59 ppm [%] | 90 | 49 | 74 |
| 2,3-oxide 2.53-2.55 ppm [%] | 8 | 8 | 8 |
| Aldehyde 8.99-9.01 ppm [%] | 0 | 0 | 1 |
| Formate 7.98-8.00 ppm [%] | 0 | 0 | 0 |
| Formate 8.11-8.13 ppm [%] | 0 | 0 | 0 |
| Alcohol 3.1-4.1 ppm [%] | 0 | 0.1 | 0.1 |
| 7.10-7.25 ppm [%] | 0 | 0 | *) |

*) numerous signals around 7 ppm which could not be assigned

The invention claimed is:

1. A process for epoxidizing an ethylenically unsaturated isobutene polymer, wherein the process comprises contacting an organic phase comprising the isobutene polymer with an aqueous phase comprising formic acid and hydrogen peroxide, wherein water is removed by azeotropic distillation during the epoxidation reaction.

2. The process according to claim 1, wherein the organic phase comprises at least one solvent selected from the group consisting of an aliphatic hydrocarbon, an alicyclic hydrocarbon, an aromatic hydrocarbon, and a halogenated hydrocarbon.

3. The process according to claim 1, wherein the aqueous phase comprises at least one mediator selected from the group consisting of:
   a) a carboxylic acid other than formic acid,
   b) a carboxylic anhydride,
   c) a carboxylic salt,
   d) a carboxylic ester,
   e) an alcohol, and
   f) an ether.

4. The process according to claim 3, wherein the at least one mediator is respectively selected from the group consisting of:
   a) acetic acid, propionic acid and mixtures thereof,
   b) acetic anhydride,
   c) sodium formate, sodium acetate,
   d) ethyl acetate,
   e) ethanol, 1-propanol, 2-propanol, and
   f) tetrahydrofuran, dioxane.

5. The process according to claim 1, wherein the hydrogen peroxide in the aqueous phase is maintained at a concentration of at least 45%.

6. The process according to claim 1, wherein the aqueous phase is removed and concentrated, and the concentrated aqueous phase is contacted again with an organic phase comprising an ethylenically unsaturated isobutene polymer.

7. The process according to claim 1, wherein the epoxidation reaction is performed at a temperature in the range of from 50° C. to 75° C.

8. The process according to claim 1, wherein the epoxidation reaction is performed at a pressure in the range of from 100 mbar to 600 mbar absolute.

9. The process according to claim 1, wherein the isobutene polymer has an average of at least 1.4 olefinic double bonds per molecule.

10. The process according to claim 1, wherein the isobutene polymer comprises at least 80% by weight of isobutene units.

11. The process according to claim 1, wherein the isobutene polymer has a number-average molecular weight of from 500 to 50,000.

12. The process according to claim 2, wherein the solvent is selected from cyclohexane and toluene.

13. The process according to claim 1, wherein the resulting epoxidized isobutene polymer is subjected to a reaction selected from the group consisting of:
 a) reaction with a polythiol or a polyamine,
 b) conversion to an aldehyde,
 c) conversion to an aldehyde, conversion of the aldehyde to an oxime and reduction of the oxime to an amine,
 d) conversion to an aldehyde, conversion of the aldehyde to a formamide and hydrolysis of the formamide to an amine,
 e) reaction with a borane, to produce a borate ester and oxidative cleavage of the borate ester to a 1,3-diol,
 f) conversion to an aldehyde, conversion of the aldehyde to an alcohol, and
 g) conversion to an aldehyde, conversion of the aldehyde to a Schiff base or an enamine, and reduction of the Schiff base or the enamine to an amine.

* * * * *